United States Patent [19]

Yokoyama et al.

[11] Patent Number: 4,554,223
[45] Date of Patent: Nov. 19, 1985

[54] FUEL CELL APPARATUS

[75] Inventors: Eiji Yokoyama, Kashiwa; Tadao Kaneko, Inagi; Yoshiaki Amano, Ibaraki; Shigeo Sugimoto, Ibaraki, all of Japan

[73] Assignee: Hitachi, Ltd., Tokyo, Japan

[21] Appl. No.: 639,099

[22] Filed: Aug. 9, 1984

[30] Foreign Application Priority Data

Aug. 17, 1983 [JP] Japan .................... 58-149189

[51] Int. Cl.4 .............................. H01M 8/06
[52] U.S. Cl. ........................ 429/20; 429/24; 429/26
[58] Field of Search ............ 429/19, 20, 26, 24; 422/106, 109, 112, 202

[56] References Cited

U.S. PATENT DOCUMENTS

| | | | |
|---|---|---|---|
| 3,499,767 | 3/1970 | Hooper | 429/20 |
| 3,522,019 | 7/1970 | Buswell et al. | 422/202 |
| 3,698,957 | 10/1972 | Sanderson | 429/20 |
| 3,973,993 | 8/1976 | Bloomfield et al. | 429/17 |
| 3,976,507 | 8/1976 | Bloomfield | 429/19 |
| 4,464,444 | 8/1984 | Mikawa | 429/24 |
| 4,473,622 | 9/1984 | Chludzinski et al. | 429/19 |

FOREIGN PATENT DOCUMENTS 0082973  5/1982  Japan ............ 429/17

Primary Examiner—Donald L. Walton
Attorney, Agent, or Firm—Antonelli, Terry & Wands

[57] ABSTRACT

In a shift converter for catalytically converting carbon monoxide and steam to carbon dioxide and hydrogen through exothermic reaction in a phosphoric acid fuel cell apparatus, the heat generated at the shift reaction is absorbed in vaporization of a liquid in a vessel provided with a reactor tube as a heat source. The catalytic exothermic reaction is carried out with cooling in the present invention, and thus it is not necessary to provide coolers at a plurality of stages in contrast to the conventional shift converter.

9 Claims, 4 Drawing Figures

FIG. I

FUEL CELL APPARATUS

BACKGROUND OF THE INVENTION

This invention relates to a shift converter for catalytically converting carbon monoxide and steam to carbon dioxide and hydrogen through catalytic exothermic reaction in a fuel reforming system of a phosphoric acid fuel cell apparatus.

PRIOR ART

Owing to the release of the heat of reaction, the shift converter of the conventional fuel cell apparatus is divided into two reaction sections, i.e. an upstream reaction section and a downstream reaction section and an external intermediate cooler is provided between the reaction sections, as is seen from "Specification for Dispersed Fuel Cell Generator" page B-7, Flow Diagram, published by EPRI, USA (Nov. 1981). Both upstream and downstream reaction sections are of adiabatic type, and the heat generated in the upstream reaction section of shift converter elevates the temperature of the reaction gas itself. The heated reactor gas is led to the intermediate cooler from the upstream reaction section, and cooled therein. Then, the cooled reaction gas is led to the downstream reaction section and subjected to further necessary reaction. Thus, three essential members, i.e. a high temperature reactor, an intermediate cooler and a low temperature reactor are required for the shift conversion, making the size of the apparatus and the heat loss larger.

For example, in a commercial-scale fuel cell apparatus of a few 100 KW, reaction proceeds as follows:

A gaseous mixture consisting of a feed gas containing methane as the main component and steam is heated in the presence of a catalyst in a reformer to reform methane into hydrogen, carbon monoxide and carbon dioxide. The gas leaving the reformer is precooled to a temperature acceptable to the catalyst of high temperature shift converter, e.g. 350°–400° C. through a cooler, and then led to the high temperature shift converter, where reaction proceeds according to the following reaction equation (1):

$$CO + H_2O \rightarrow CO_2 + H_2 \qquad \ldots (1)$$

Since the reaction is exothermic, the gas temperature is elevated. To increase the carbon monoxide concentration, it is necessary to conduct the shift conversion at a low temperature. Thus, the reaction gas leaving the high temperature shift converter is led to the intermediate cooler, cooled to about 200° C., and then led to the low temperature shift converter, where the reaction further proceeds according to the reaction equation (1). The reaction gas, whose carbon monoxide concentration has been reduced to less than 1% thereby, is cooled to a temperature suitable for the fuel cell through another cooler provided after the low temperature shift converter, and then led to the hydrogen electrode of the fuel cell.

SUMMARY OF THE INVENTION

An object of the present invention is to provide a fuel cell apparatus with a compact shift converter.

Another object of the present invention is to provide a shift converter suitable for a fuel cell apparatus where a waste heat from the fuel cell is utilized in an absorption chiller to obtained a cooled air.

Other object of the present invention will be apparent from the disclosure which follows and also from the accompanying drawings.

To attain these object of the present invention, the present invention provides a shift converter with the following structure in a fuel cell apparatus. That is, the present shift converter comprises one reaction section which is made to serve as a compound isothermal reactor capable of being cooled through water vaporization to withdraw the heat of reaction from the shift converter and keep the shift converter stably at a predetermined temperature.

BRIEF DESCRIPTION OF THE DRAWINGS

The accompanying drawings show a fuel cell apparatus according to the present invention, in which.

PREFERRED EMBODIMENTS OF THE INVENTION

Embodiments of the present invention will be described below, referring to the accompanying drawings. First of all, a basic embodiment of the present invention will be described, referring to FIG. 1.

Figure 1:
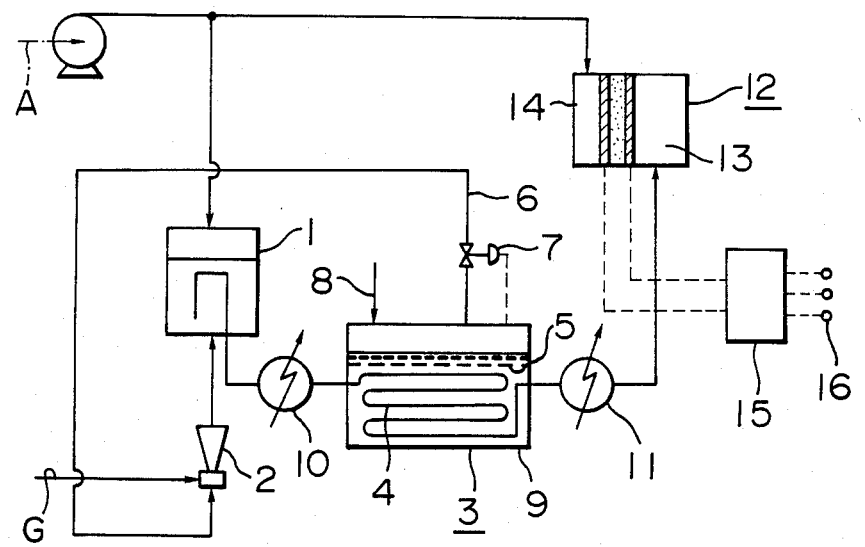
FIG. 1 is a flow diagram showing a first embodiment of the present invention.

In FIG. 1, a fuel G such as natural gas, etc. is led to a reformer 1 together with steam, after mixing of the gas with the steam in a mixer 2. In the reformer 1, the fuel G containing the steam is converted to a gas containing much hydrogen, and the resulting gas is led to a shift converter 3.

A cooler 10 is provided between the reformer 1 and the shift converter 3, and the gas from the reformer 1 is cooled to a temperature acceptable to the catalyst in the shift converter 3 by the cooler 10, and then led to the shift converter 3.

Another cooler 11 is provided at the outlet of the shift converter 3, and the gas leaving the shift converter 3 is cooled to a temperature acceptable to a hydrogen electrode 13 of a fuel cell 12 by the cooler 11.

On the other hand, air A is supplied to an oxygen electrode 14 of the fuel cell 12 and also to a combustion section (not shown in the drawing) of reformer 1 by a blower, etc. As a result, a DC output can be obtained from the fuel cell 12, and an AC output 16 is obtained therefrom through an inverter 15.

The said shift converter 3 has the following structure.

Reaction tube 4 of shift converter 3 is connected to the outlet of cooler 10 at the one end and to the inlet of another cooler 11 at the other end, and the reaction tube 4 has a heat exchanger section, in which at least one catalyst capable of promoting reaction of the gas from the reformer 1 is filled. The reaction tube 4 is encased in a vessel 9, in which water 5 is filled. The filled water 5 has a function to absorb the heat of reaction released from the reaction of the gas over the catalyst according to the said reaction equation (1). A water make-up means 8 is provided at the vessel 9 to supply water 5 to the vessel 9 so as to keep the water 5 at a constant level in the vessel 9. A steam discharge line 6 is provided at the top of the vessel 9 to lead steam generated by vaporization of water 5 by the heat of reaction to the outside. In the present embodiment, the steam discharge line 6 is connected to the reformer 1 to lead the generated steam thereto. With this structure, the steam for the reaction with methane in the reformer 1 can be continuously and conveniently obtained.

A control valve 7 is provided in the steam discharge line 6 and has a function to keep a constant steam pressure in the vessel 9.

Figure 2:
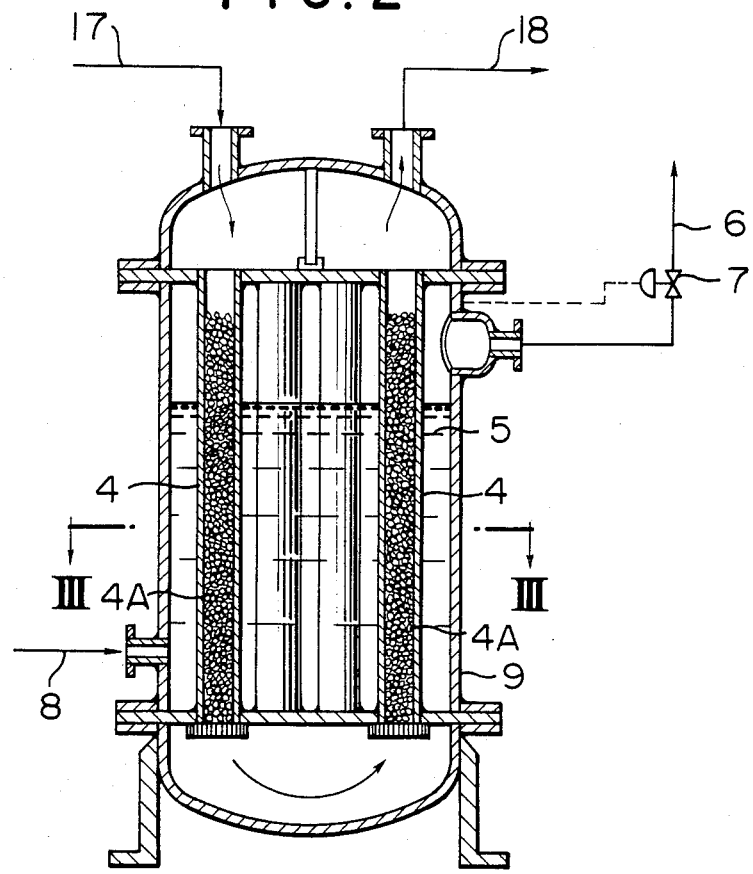
FIG. 2 is a detailed, cross-sectional elevation view of one embodiment of shift converter in FIG. 1.
Figure 3:
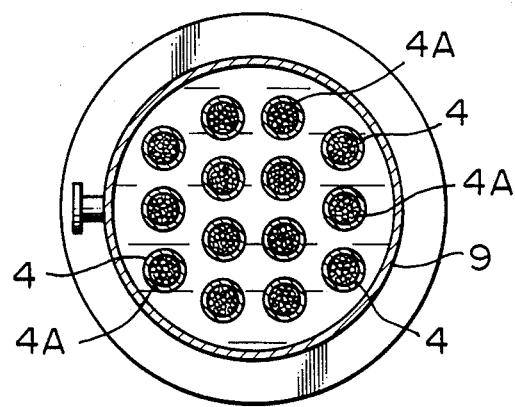
FIG. 3 is a detailed, cross-sectional plan view along the line III—III of FIG. 2.

Detailed embodiment of the said shift converter 3 is shown in FIGS. 2 and 3, where members identical with those of FIG. 1 are identified by the same reference numerals as in FIG. 1. Numerals 4A, .... 4A show the catalysts filled in reaction tubes 4, numeral 17 shows a piping connecting the cooler 10 to the shift converter 3, and numeral 18 shows another piping connecting another cooler 11 to the shift converter 3.

The shift converter 3 having the structure as described above functions as follows:

The gas led to the shift converter 3 undergoes reaction according to the reaction equation (1) while being passed through the reaction tubes 4. The heat generated by the reaction is transmitted to the water 5 around the reaction tubes 4 to vaporize the water 5. That is, the gas is cooled through water vaporization in the vessel 9.

In the present embodiment, the conventional combination of the high temperature shift converter, the intermediate cooler and the low temperature shift converter can be replaced with the shift converter 3, and thus the structure can be made more compact in the present invention. Boiling temperature of water 5 can be kept constant, so long as the pressure is constant. Thus, the reaction temperature of shift converter 3 can be kept constant, irrespective of the degree of load, by keeping the inside pressure of the vessel 9 constant. Furthermore, the shift converter 3 is a compound reactor, and thus the lines connecting the high temperature shift converter, the intermediate cooler and the low temperature shift converter can be omitted, resulting to a less gas pressure loss and less heat dissipation from the line surfaces and also resulting in an increase in the overall efficiency of the fuel cell apparatus.

Figure 4:
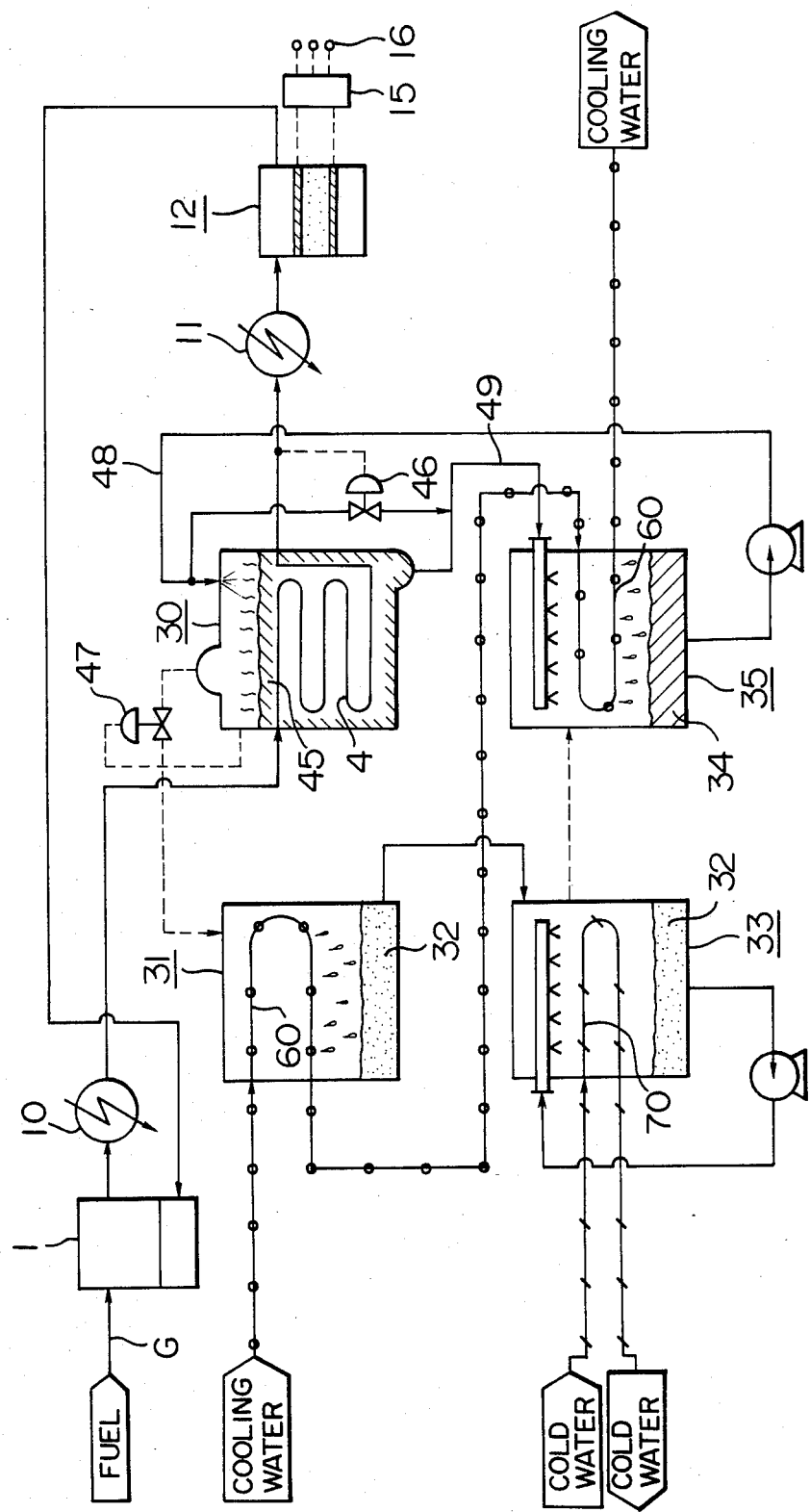
FIG. 4 is a flow diagram according to a second embodiment of the present invention.

FIG. 4 shows a second embodiment of the present invention as applied to a system of operating an absorption chiller by the waste heat from a fuel cell apparatus disclosed in Japanese patent application Kokai (Laid-open) No. 50-77842.

In FIG. 4, the same members as shown in FIG. 1 are identified with the same reference numerals as used in FIG. 1, and then explanation is thus omitted.

Generator 30 of absorption chiller is provided between the cooler 10 and another cooler 11 and encases reaction tube 4. Refrigerant vapor generated in the generator 30 is led to a condenser 31 to recover a liquid refrigerant 32, and the liquid refrigerant 32 recovered in the condenser 31 is led to a vaporizer 33, for example, to produce cold water. Absorber 35 is provided between the vaporizer 33 and the generator 30, and concentrated solution from generator 30 is led to the absorber 35 to absorb the vapor generated in the vaporizer 33 into the concentrated solution, thereby producing a dilute solution 34. Thus, the absorption chiller can establish an absorption chilling cycle. In FIG. 4, numeral 45 shows a solution of lithium bromide, etc. contained in the generator 30, numeral 48 shows a solution line that transfers the dilute solution 34 from the absorber 35 into the generator 30 to make up the solution 45. Numeral 49 shows a concentrated solution discharge line which is provided at the bottom of the generator 30 and leads the concentrated solution from the generator 30 to the absorber 35, numeral 46 shows a valve for bypassing a portion of the dilute solution 34 to the concentrated solution discharge line 49 and is provided at the inlet to the generator 30 to keep a constant gas outlet temperature in the generator 30, and numeral 47 shows a pressure control valve having a function to keep a constant steam pressure in the generator 30, and the pressure control valve 47 is provided in the steam discharge line between the generator 30 and the condenser 31. Numeral 60 shows heat exchangers provided in the condenser 31 and the absorber 35 to pass cooling water therethrough, and numeral 70 is another heat exchanger provided in the vaporizer 33 to pass cold water therethrough so as to produce cold water at a predetermined temperature.

In this structure, the reformed gas passes through the reaction tube 4, and the reaction proceeds according to the reaction equation (1). The solution 45 around the reaction tube 4 is heated and concentrated by the heat of reaction generated during the reaction. The resulting concentrated solution is led to the absorber 35 of absorption chiller, while the generated steam is led to the condenser 31, whereby the absorption-chilling cycle can be established. Other functions are the same as in the first embodiment, and their description is omitted.

In the second embodiment with the foregoing structure, the following effect can be obtained in addition to the effects of the first embodiment.

In a fuel cell apparatus integrated with an absorption chiller for utilizing the waste heat from a fuel cell, the generator itself of absorption chiller is constructed so as to serve as a shift converter, and thus the entire apparatus can be made more compact.

In the foregoing first and second embodiments, use of coolers 10 and 12 is exemplified, but, needless to say, such use is not always necessary, if the gas leaving the reformer is so cool as to have the predetermined temperature and if a high temperature is acceptable to the hydrogen electrode of fuel cell.

As described above, the heat generated through the shift reaction is absorbed by evaporation of a liquid in a vessel provided with the shift reaction tube as a heat source in the present invention, and thus the exothermic reaction can be carried out with cooling, so that it is not necessary to provide coolers at a plurality of stages, in contrast to the conventional shift converter. Thus, the present invention can make a fuel cell apparatus more compact.

What is claimed is:

1. A fuel cell apparatus comprising a reformer for reforming a fuel such as natural gas, etc. into a gas containing much hydrogen, a shift converter for catalytically converting most of carbon monoxide contained in the gas leaving the reformer to carbon dioxide, and a fuel cell for generating an electric current from the gas leaving the shift converter and air, wherein the shift converter comprises:
 (a) a reaction tube filled with at least one catalyst, one end of the reactor tube being connected to the outlet of the reformer and the other end being connected to the inlet of an anode of the fuel cell,
 (b) a vessel encasing the reaction tube and also containing a liquid for cooling the reactor tube, (c) a vapor discharge means provided at the vessel for discharging vapor of the liquid generated by the heat of reaction from the reaction tube, (d) a means for leading the liquid to the vessel only in an amount corresponding to at least an amount of the vaporized liquid, provided at the vessel, and (e) a means for keeping a constant pressure in the vessel.

2. A fuel cell apparatus according to claim 1, wherein the means for keeping a constant pressure in the vessel is provided at the vapor discharge means.

3. A fuel cell apparatus according to claim 1, wherein the other end of the vapor discharge means is connected to the reformer.

4. A fuel cell apparatus according to claim 3, wherein the other end of the vapor discharge means is directly connected to the reformer.

5. A fuel cell apparatus according to claim 1, wherein a first cooling means is provided between the reformer and one end of the reactor tube, and a second cooling means is provided between the other end of the reaction tube and the anode section of the fuel cell.

6. A fuel cell apparatus according to claim 1, wherein the liquid for cooling the reactor tube is water.

7. A fuel cell apparatus according to claim 6, wherein the other end of the vapor discharge means is directly connected to the reformer.

8. A fuel cell apparatus comprising a reformer for reforming a fuel such as natural gas, etc. into a gas containing much hydrogen, a shift converter for catalytically converting most of carbon monoxide contained in the gas leaving the reformer to carbon dioxide, and a fuel cell for generating an electric current from the gas leaving the shift converter and air, wherein an absorption chiller for utilizing waste heat from the apparatus is integrated in the apparatus, and the shift converter comprises:

(a) a reaction tube filled with at least one catalyst, provided in a generator of the absorption chiller, one end of the reactor tube being connected to the outlet of the reformer and the other end being connected to the inlet of an anode section of the fuel cell, (b) a vapor discharge means, provided at the generator and connected to a condenser of the absorption chiller, for discharging a refrigerant vapor generated from a solution in the generator by the heat of reaction from the reaction tube, (c) a means for leading the solution to the generator only in an amount corresponding to at least an amount of the generator refrigerant vapor, provided at the generator, and (d) a means for keeping a constant pressure in the generator.

9. A fuel cell apparatus according to claim 8, wherein a bypass line is provided between a concentrated solution line connecting the generator to an absorber of the absorption chiller and the means for leading the solution to the generator, and a means for controlling an amount of the solution through the means for leading the solution to the generator in view of an outlet temperature of the reaction tube is provided in the bypass line.

* * * * *